US007095890B2

(12) United States Patent
Paragios et al.

(10) Patent No.: US 7,095,890 B2
(45) Date of Patent: Aug. 22, 2006

(54) INTEGRATION OF VISUAL INFORMATION, ANATOMIC CONSTRAINTS AND PRIOR SHAPE KNOWLEDGE FOR MEDICAL SEGMENTATIONS

(75) Inventors: Nikolaos Paragios, Plainsboro, NJ (US); Visvanathan Ramesh, Plainsboro, NJ (US); Mikael Rousson, Preaux (FR)

(73) Assignee: Siemens Corporate Research, Inc., Princeton, NJ (US)

( * ) Notice: Subject to any disclaimer, the term of this patent is extended or adjusted under 35 U.S.C. 154(b) by 738 days.

(21) Appl. No.: 10/356,455

(22) Filed: Jan. 31, 2003

(65) Prior Publication Data

US 2004/0019267 A1    Jan. 29, 2004

Related U.S. Application Data

(60) Provisional application No. 60/354,005, filed on Feb. 1, 2002, provisional application No. 60/354,004, filed on Feb. 1, 2002.

(51) Int. Cl.
*G06K 9/34* (2006.01)
*G06K 9/00* (2006.01)
*G06K 9/48* (2006.01)

(52) U.S. Cl. ...................... 382/173; 382/128

(58) Field of Classification Search ............... 382/103, 382/128, 130, 131, 133, 164, 173, 181, 190, 382/195, 199, 203, 204, 206, 228, 284; 358/515, 358/520, 530; 345/407, 420; 600/437
See application file for complete search history.

(56) References Cited

U.S. PATENT DOCUMENTS

| 6,205,235 | B1 * | 3/2001 | Roberts ................... 382/128 |
| 6,301,496 | B1 * | 10/2001 | Reisfeld .................. 600/407 |
| 6,785,409 | B1 * | 8/2004 | Suri ....................... 382/128 |
| 6,839,462 | B1 * | 1/2005 | Kitney et al. ............. 382/173 |
| 6,858,007 | B1 * | 2/2005 | Akselrod et al. .......... 600/437 |
| 6,947,040 | B1 * | 9/2005 | Tek et al. ................ 345/420 |
| 6,978,039 | B1 * | 12/2005 | Cline et al. ............. 382/128 |
| 2003/0053667 | A1 * | 3/2003 | Paragios et al. .......... 382/128 |
| 2003/0142857 | A1 * | 7/2003 | Alyassin ................. 382/131 |
| 2003/0142868 | A1 * | 7/2003 | Tannenbaum et al. ....... 382/199 |

* cited by examiner

*Primary Examiner*—Amir Alavi
(74) *Attorney, Agent, or Firm*—Donald B. Paschburg; F. Chau & Associates, LL (57) ABSTRACT

This invention relates to the integration of visual information, anatomic constraints, prior shape knowledge, and level set representations for the segmentation of medical images. An embodiment according to the present invention comprises a level set variational framework that uses a bi-directional boundary flow, an intensity-based regional component that maximizes the a posteriori segmentation probability, a physiology-based module that constrains the solution space and a term that accounts for shape-driven consistency. All modules are expressed in an energetic form and the resulting objective function is optimized using a gradient descent method.

21 Claims, 5 Drawing Sheets

INTEGRATION OF VISUAL INFORMATION, ANATOMIC CONSTRAINTS AND PRIOR SHAPE KNOWLEDGE FOR MEDICAL SEGMENTATIONS

CROSS REFERENCE TO RELATED APPLICATION

This application claims the benefit of U.S. Provisional Application Ser. No. 60/354,005 filed on Feb. 1, 2002, and U.S. Provisional Application Ser. No. 60/354,004 filed on Feb. 1, 2002, which are incorporated by reference herein in their entirety.

FIELD OF THE INVENTION

This invention relates to the integration of visual information, anatomic constraints, prior shape knowledge, within level set representations for medical segmentation and grouping.

BACKGROUND OF THE INVENTION

Cardiovascular diseases are one of the leading causes of death in United States. The development of new technologies to diagnose cardiovascular diseases has led to a decline of the mortality rate. Magnetic resonance imaging ("MRI") provides time varying three dimensional imagery of the heart that can be processed using Computer Vision techniques. The three dimensional imagery can then be used for diagnostic purposes. Therefore, physicians are interested in identifying heart chambers using three dimensional imagery so that this information can be used for diagnostic purposes.

In medical applications the areas of interest in the image domain are actual anatomic structures. The segmentation result is constrained according to some a priori high level knowledge of an anatomic structure, such as, forms, relative positions, and motion over time.

The extraction of accurate results is a requirement in medical applications. Therefore, predominately boundary-based methods, enforced by some region-based segmentation modules, have been employed to cope with the segmentation task. These methods can be classified into two categories. The first category is parametric methods that determine the segmentation map by fitting a boundary template to the image. The second category is non-parametric methods that are based on the propagation of regular curves under the influence of local image characteristics.

Parametric methods have real-time performance and can deal with incomplete data and slight deformations due to shape-driven constraints. However, such methods primarily refer to boundary information and require complicated models to deal with important shape deformations while topological changes cannot be handled.

Non-Parametric methods can deal with important shape deformations and topological changes. At the same time these methods do not require a priori knowledge. However, non-parametric methods do not have a robust behavior due to the presence of noise and are time consuming.

Identifying heart chambers, in particular, the endocardium and the epicardium, is a challenging problem in medical image analysis. Furthermore, measuring ventricular blood volume, ventricular wall mass, ventricular wall motion and wall thickening properties over various stages of a cardiac cycle are powerful diagnostic tools that are studied in medical image analysis. The left ventricle is of particular interest because it pumps oxygenated blood out of the heart to distant tissue in the entire body. The information space refers to physically corrupted data. Small parts, for example, papillary muscles, of an endocardium do not have the same intensity properties as its dominant parts. At the same time, the separation, that is, boundaries, of the epicardium and the rest of the heart is practically impossible to detect in some areas, due to lack of information.

A need exists for a unified mathematical framework that makes optimal use of visual information, translates high level application constraints into low level segmentation modules, is able to deal with lack of visual information, and is able to deal with physically corrupted data.

SUMMARY OF THE INVENTION

An embodiment according to the present invention allows for identifying heart chambers, in particular, the endocardium and the epicardium. Another embodiment according to the present invention measures ventricular blood volume, ventricular wall mass, ventricular wall motion and wall thickening properties over various stages of a cardiac cycle.

An embodiment according to the present invention further comprises two principles. The first principle is that a segmentation map is in accordance with visual information, such as, boundary and regional information. The second principle is that the segmentation map has to respect the physiology of anatomical structures, that is, relative positions and shape forms, of the heart. Therefore, an embodiment according to the present invention comprises a level set variational framework that uses a bi-directional boundary flow, an intensity-based regional component that maximizes the a posteriori segmentation probability, a physiology-based module that constrains the solution space and a term that accounts for shape-driven consistency. All modules are expressed in an energetic form and the resulting objective function is optimized using a gradient descent method.

DETAILED DESCRIPTION OF PREFERRED EMBODIMENTS

Figure 1:
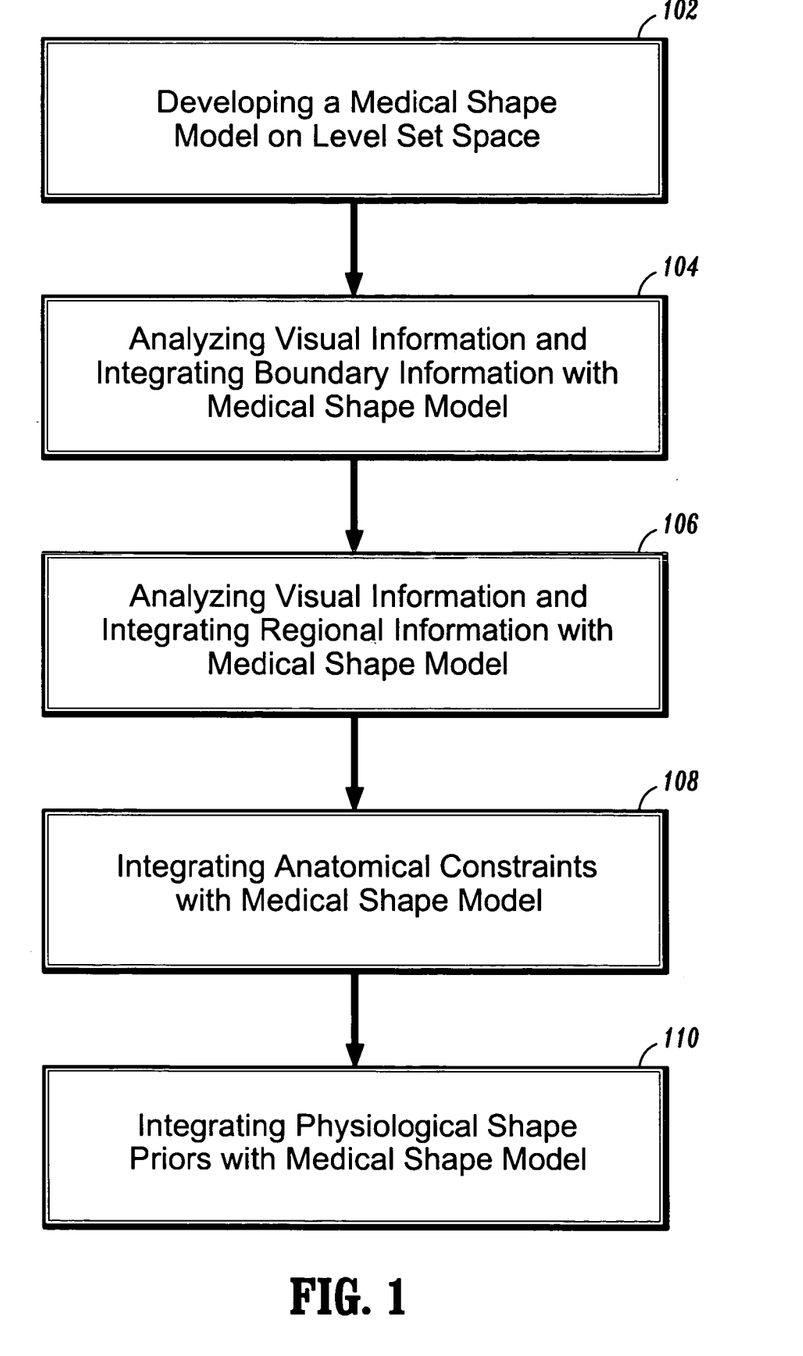
FIG. 1 is a flow diagram illustrating a method using anatomy shape priors for level set representation according to an embodiment of the present invention.

Segmenting medical structures is a challenging application in computer vision. Referring to FIG. 1, a method according to an embodiment of the present invention comprises an energetic form,that introduces shape constraints to level set representations. Step 102 includes developing a medical shape model on level set space for tracking moving interfaces. The development of the medical shape model is described in detail below in Medical Shape Prior Model Construction. In step 104, visual information is analyzed and boundary information is integrated with the medical shape model. The integration of boundary information is described in detail below in Boundary Module. In step 106, visual information is analyzed and regional information is integrated with the medical shape model. The integration of regional information is described in detail below in Regional Intensity-Based Module. In step 108, a further integration of anatomical constraints occurs with the medical shape model. The integration of anatomical constraints is described in detail below in Anatomical Constraints. In step 110, the medical shape model is integrated with physiological shape priors to recover an object of interest. The integration of the medical shape model with physiological shape priors is described below in Level Set Physiological Shape Priors. This formulation of steps 102 through 110 exploits all advantages of level set representations resulting in a method that can deal with a large number of parametric, as well as, continuous transformations. Furthermore, the integration of existing level set based segmentation methods leads to paradigms that can deal with noisy, occluded, missing and physically corrupted data.

Figure 2:
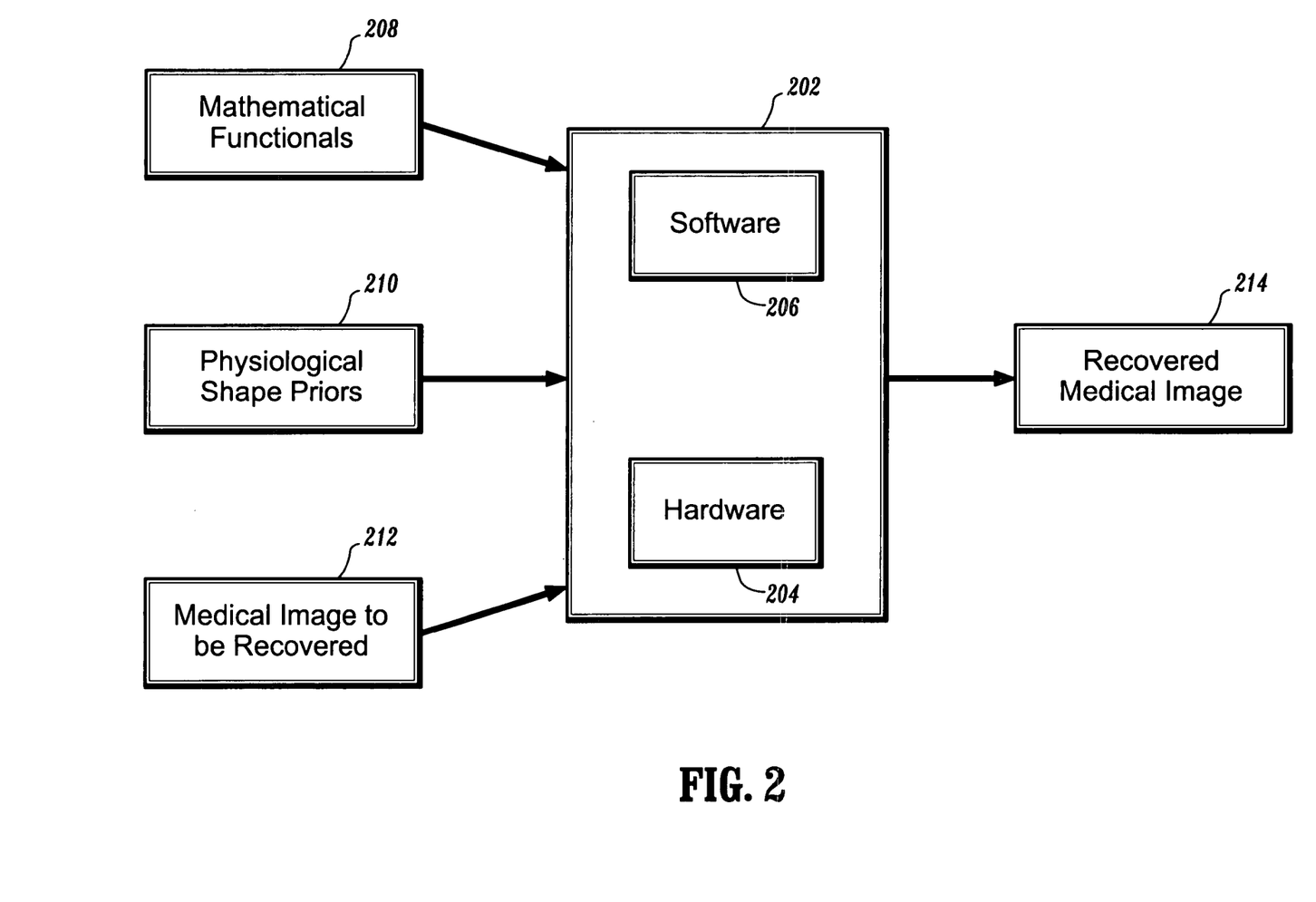
FIG. 2 illustrates is a functional block diagram according to an embodiment of the present invention.

Referring to FIG. 2 a process is illustrated according to an embodiment of the present invention. A computer system 202 having a hardware component 204, for example, a server and storage device, and software component 206, for example, an operating system and computer programs, according to an embodiment of the present invention receives input of mathematical functionals 208, physiological shape priors 210, and a medical image 212 that is to be recovered. Shape prior propagation and minimization of non-stationary distance are used to produce recovered medical image 214. The process is now described in detail.

An embodiment according to the present invention comprises a variational formulation based on level set representations to deal with the segmentation of the left ventricle in Magnetic Resonance Images ("MRI"). The variational formulation integrates visual information, anatomical constraints and prior knowledge of cardiac shapes. The visual information is expressed through a boundary attraction component and an intensity-based grouping module. The anatomical constraints are derived from physiology and refer to relative positions of cardiac structures of interest. Finally, shape knowledge is obtained through a construction of a cardiac prior model that constrains the solution space within a family of shapes. The resulting paradigm can accommodate noisy, incomplete, physically corrupted data, and cardiac deformations, such as systole and diastole.

Figure 3:
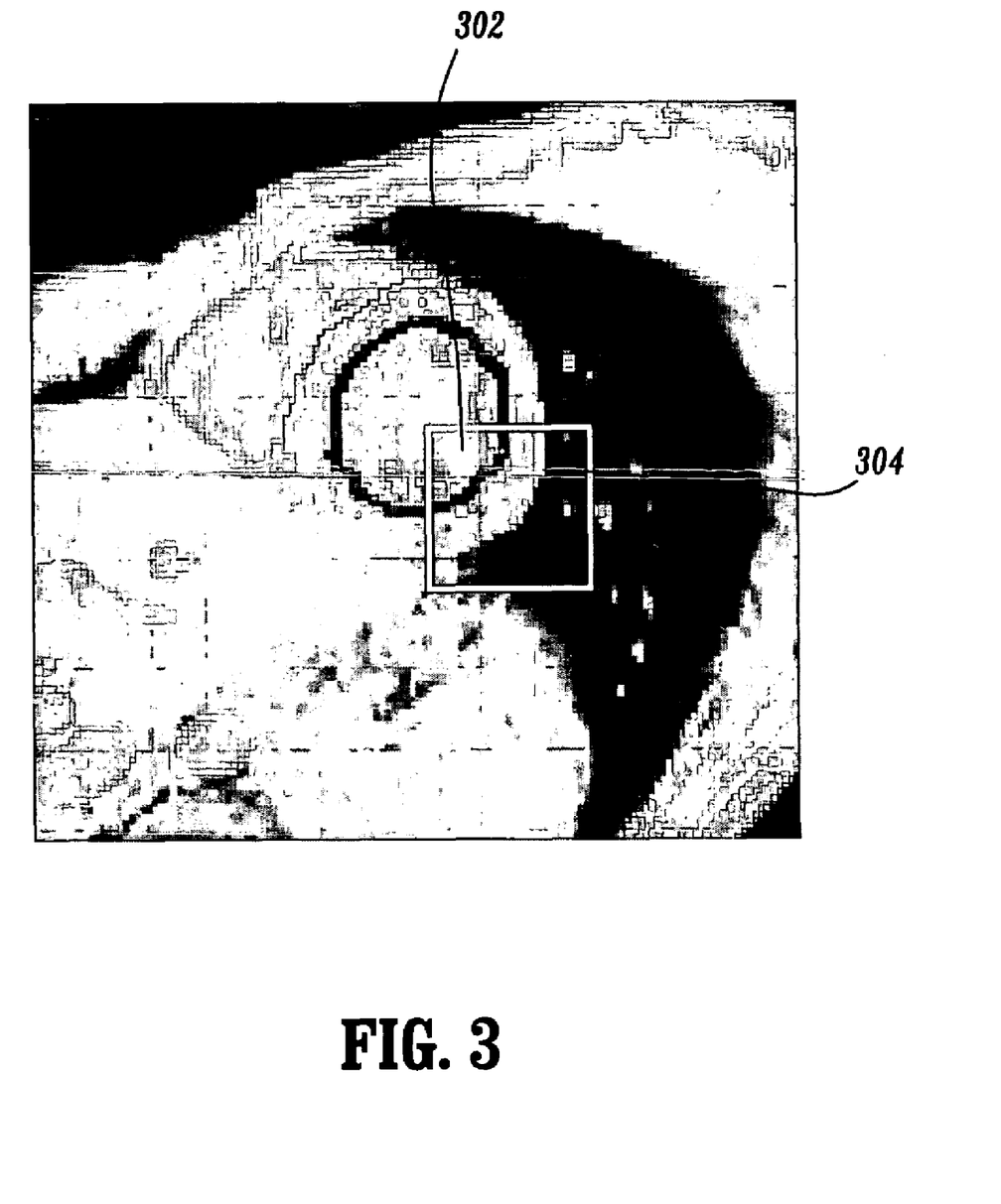
FIG. 3 is an image illustrating an epicardium interface and an endocardium interface according to an embodiment of the present invention.

In an embodiment according to the present invention, extraction of the myocardium, can be achieved using three modal image segmentation. Segmentation refers to the endocardium, the epicardium and background. In particular, the area between the endocardium and the epicardium is evaluated. Using a common technique in Computer Vision, such as, evolving interfaces according to some data driven information area can be recovered. An embodiment of the present invention can best be introduced using the following definitions, referring to FIG. 3, $\partial R_O$ represents the epicardium interface (light gray contour) 302 and $\partial R_I$ represents the endocardium interface (dark gray contour) 304. These contours 302, 304 can be used to define a three modal image partition given by (i) $R_I$ endocardium, (ii) $R_O-R_I$ myocardium, and (iii) $\Omega-R_O$ background. The region of interest is the myocardium.

Level Set Representations

Level Set Representations are a powerful mathematical tool able to deal with applications that share a common concern, such as, evolving interfaces. These representations are best understood by using a two dimensional case and an evolving interface $[\partial R]$ in an Euclidean plane, such that $[\partial R: [0,1] \to R^2, p \to \partial R(p)]$. Presuming the propagation of $\partial R(p,t)$ takes place in the direction of its inward normal N according to a scalar function of curvature K, then $$\frac{d}{dt}\partial \Re(p_- = F(K(p))N(p)$$

Then, $\Phi: \Omega \to R^+$ is a Lipchitz function that refers to a level set representation:

$$\Phi(x, y; t) = \begin{cases} 0, (x, y) \in \partial R(t) \\ +D((x, y), \partial \Re(t)) > 0, (x, y) \in R(t) \\ -D((x, y), \partial \Re(t)) < 0, (x, y) \in [\Omega - R(t)] \end{cases}$$

where an evolving interface $[\partial R]$ is represented as the zero iso-surface of $\Phi$ and $D((x,y), \partial R(t))$ is the minimum Euclidean distance between the pixel $(x,y)$ and the interface $R(t)$ at time t.

This representation evolves in the following manner:

$$\frac{d}{dt}\Phi(p) = -F(K(p))|\nabla \Phi(p)|$$

These representations are implicit, parameter free, topology free and provide a natural way to estimate geometrical properties of the evolving interface.

Two level set representations have to be evaluated for the segmentation of the Left Ventricle, one for the endocardium $[\Phi_I]$ and one for the epicardium $[\Phi_O]$. The notation can be simplified as:

$$\Phi_I = \begin{cases} 0, \partial R_I \\ +D(\partial R_I) > 0, R_I, \\ -D(\partial R_I) < 0, [\Omega - R_I] \end{cases} \quad \Phi_O(p) = \begin{cases} 0, \partial R_I \\ +D(\partial R_o) > 0, R_o, \\ -D(\partial R_o) < 0, [\Omega - R_o] \end{cases}$$

To connect the use of these representations with energy minimization techniques and the propagation of curves, define the approximation of Dirac and Heaviside distributions as:

$$\delta_\alpha(\phi) = \begin{cases} 0, |\phi| > \alpha \\ \frac{1}{2\alpha}\left(1 + cps\left(\frac{\pi\phi}{a}\right)\right), |\phi| < \alpha \end{cases}$$

$$H_\alpha(\phi) = \begin{cases} 1, \phi > \alpha \\ 0, \phi < -\alpha \\ \frac{1}{2}\left(1 + \frac{\phi}{\alpha} + \frac{1}{\pi}\sin\left(\frac{\pi\phi}{\alpha}\right)\right), |\phi| < \alpha \end{cases}$$

Then it can be demonstrated that $\{(x,y)\in\Omega: \lim_{a\to o^+}[H_\alpha(\phi((x,y);t))]=1\}=R$ $\{(x,y)\in\Omega: \lim_{a\to o^+}[\delta_\alpha(\phi((x,y);t))]=1\}=\partial R$.

Using these components, define boundary-based modules and region-based modules for the evolving interface as follows:

$$\underbrace{\int\int_\Omega H_\alpha(\Phi(x,y))r(I(x,y))dxdy}_{\text{region module}} \quad \text{(i)}$$

$$\underbrace{\int\int_\Omega \delta_\alpha(\Phi(x,y))b(I(x,y))\left|\nabla\Phi(x,y)\right|dxdy}_{\text{boundary module}} \quad \text{(ii)}$$

where r and g are region and boundary attraction functions. These modules have the following interpretation: the first term [i] refers to a grouping component since it accounts for some regional properties, that is modulo the definition of r, of the area defined by the evolving interface. The second term [ii] refers to the interface points and the term can be a combination of a boundary attraction term, that is, modulo the definition of b, and a smoothness component, such as, a geodesic active contour.

These general purpose segmentation modules can now be used to provide a data-driven solution for the extraction of the myocardium.

Visual Information Modules

Image segmentation approaches can be classified as either boundary-based, that rely on the generation of a strength image and the extraction of prominent edges, or region-based, that rely on the homogeneity of spatially localized features and properties.

Boundary Module

A common way to determine boundary information is through a gradient image and a monotonically decreasing function g( ), for example, $$g(I) = \frac{1}{1+|\nabla I_s|}, \; g(I) = \frac{1}{\sqrt{2\pi}\,\sigma} e^{-\frac{|\nabla I_s|}{2\sigma^2}}.$$

Then, within the level set representation, a geodesic active contour model can be considered to provide a boundary-based segmentation solution. The geodesic active contour model is directed to finding a minimal length geodesic curve taking into account desired image characteristics. Given the application framework, two energy components/geodesic curves, such as endocardium and epicardium, are used:

$$E(\Phi_I, \Phi_O) = \underbrace{\int\int_\Omega \delta_\alpha(\Phi_I)g(I)|\nabla\Phi_I|}_{\text{endocardiumboundaryattraction}} + \underbrace{\int\int_\Omega \delta_\alpha(\Phi_O)g(I)|\nabla\Phi_O|}_{\text{epicardiumboundaryattraction}}$$

This energy is minimized using a gradient descent method. The calculus of variations provides flows that shrink initial interfaces towards the cardiac boundaries while respecting some internal regularity constraints. Although these flows have been proven to be efficient in numerous applications, they suffer from being myopic since the data driven term tends to shrink the interface, such as in single directional flows. Although this component may not be appropriate for boundary extraction, it can be used to introduce constraints that account for some desired internal properties, for example, smoothness, of the evolving interfaces:

$$E(\Phi_I, \Phi_O) = \underbrace{\int\int_\Omega \delta_\alpha(\Phi_I)|\nabla\Phi_I|}_{\text{endocardiumsmoothness}} + \underbrace{\int\int_\Omega \delta_\alpha(\Phi_O)|\nabla\Phi_O|}_{\text{epicardiumsmoothness}}.$$

The limitation of the Geodesic Active Contour model, that is, a single directional flow, can be dealt with using gradient vector flow ("GVF"). This field refers to the definition of a bi-directional external force that captures object boundaries from either side and can accommodate concave regions. The GVF comprises a two dimensional vector field $[v(p)=(V^x(p), V^y(p)), p=(x,y)]$ that minimizes the following energy:

$$E(v) = \int\int \mu((v_x^x)^2+(v_y^x)^2+(v_x^y)^2+(v_x^y)^2) + |\nabla f|^2|v-\nabla f|^2 dxdy,$$

where $[f(p)=1-g(p)]$ and $\mu$ is a blending parameter. According to this function, areas where the information is constant $[|\nabla f|\to 0]$, are dominated by partial derivatives of the field, such as, smooth flow map. Discontinuities of the boundary space, that is $|\nabla f|$ is large, activate the second term energy, leading to $v=\nabla f$.

The objective function does not make direct use of the boundary information, that is, only the gradient of the boundary affects the flow. This characteristic can be considered a limitation since strong edges, as well as, weak edges may create a similar flow due to the diffusion process. To overcome this problem, the objective function can be modified by introducing boundary information in a direct form, such as:

$$E(v)=\int\int \mu(v_x^x)^2+(v_y^x)^2+(v_x^y)^2+(v_x^y)^2)+f|\nabla f|^2|v-\nabla f|^2 dxdy$$

This modification induces the ability of overcoming weak edges due to noise presence. Also, it leads to an appropriate diffusion of the boundary information. Strong edges overcome/compensate flows that are produced by weak edges. The minimization of the objective function will lead to a diffusion flow that propagates the information from the objects boundaries to the background.

This field was originally used to propose a bi-directional flow that can reach an object's boundaries from either side. However, changing topology was an important limitation of the original flow. Changing topology was dealt with in a non-energetic form by integrating the GVF to the geodesic active contour flow.

An embodiment according to the present invention integrates the GVF flow to level set representations in an energetic form. The increase of flux of an auxiliary vector field can be optimized using images of low contrast, for example, elongated structures, such as blood vessels. Thus, the following minimization criterion can be achieved:

$$E_B(\Phi_I, \Phi_O) = \underbrace{\int\int_\Omega \delta_\alpha(\Phi_I)[\nabla\Phi_I \cdot (v^x, y^y)]}_{\text{endocardiumboundaryattraction}} + \underbrace{\int\int_\Omega \delta_\alpha(\Phi_O)[\nabla\Phi_O \cdot (v^x, y^y)]}_{\text{epicardiumboundaryattraction}}$$

The minimization of this energy component can be done using a gradient descent method and the calculus of variations. The obtained motion equations refer to a bi-directional flow that can reach the object's boundaries from either side.

Regional Intensity-Based Module

Regional/global information has been used to provide segmentation results and improve the performance of boundary-based flows. A regional intensity module can use an evolving interface to define an image partition that is optimal with respect to some grouping criterion. For medical images, observed intensities depend on the properties of the corresponding tissue being mapped.

Figure 4:
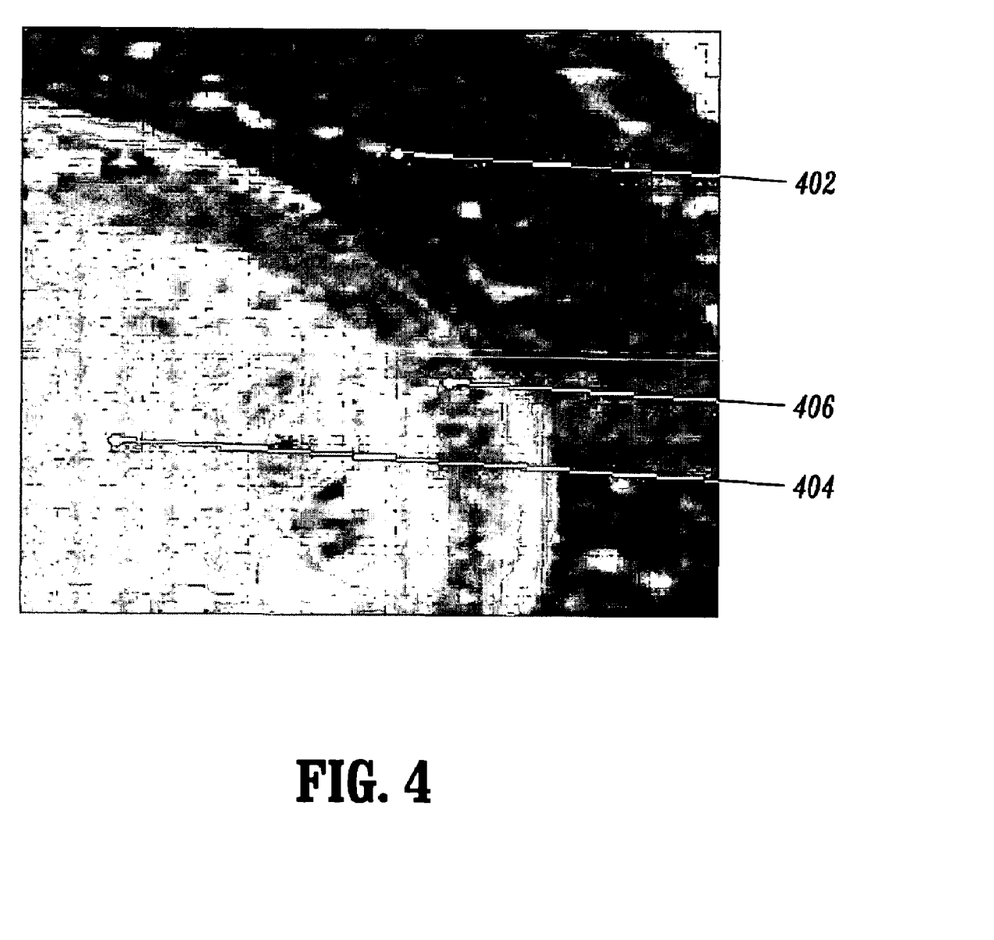
FIG. 4 is an image illustrating MR sequences of a left ventricle according to an embodiment of the present invention.

Furthermore, referring to FIG. 4, the MR sequences of the left ventricle have three populations: (i) blood (bright) 402, (ii) muscles (gray) 404, and (iii) air-filled lungs (dark gray) 406. The characteristics of these populations vary spatially and temporally, but their intensity properties can be discriminated according to their relative differences. Therefore, an observed distribution, that is, a histogram, of a wide epicardium region is a Gaussian mixture model with three components. Let $p_I$ be the endocardium density function, $p_O$ the myocardium density function and $p_B$ the density function of the rest of the cardiac organs, that is the background. Then, $$p(I)=p_I p_I(I)+p_O p_O(I)+p_B p_B(I)$$

where $p_I$, $p_O$, $p_B$ are the a priori probabilities for the endocardium, the myocardium, and the background components. The unknown parameters of this model can be estimated using an expectation-maximization principle.

The image partition that accounts for the expected image characteristics of the different components is the one that maximizes the a posteriori segmentation probability:

$$E(\Phi_I, \Phi_O) = \underbrace{\int\int_\Omega H_O(\Phi_I)g(p_I(I))}_{endocardium} +$$

$$\underbrace{\int\int_\Omega H_\alpha(\Phi_O)(1-H\alpha(\Phi_I))g(po(I))}_{mycardium} + \underbrace{\int\int_\Omega (1-H\alpha(\Phi_O))g(p_B(I))}_{background}$$

where g is a monotonically decreasing function. The myocardium is the region between the epicardium [$\Phi_O$, $H_\alpha$ ($\Phi_I$)>0] and the endocardium [$\Phi_1$, $H_\alpha$ ($\Phi_I$)<0].

Although the use of this module improves the performance of the segmentation algorithm, there are cases where it produces sub-optimal results. The intensity properties of the papillary muscles do not follow the endocardium distribution and most of the cardiac organs located at the bottom-left part of the left ventricle follow the myocardium intensity properties. Therefore, the papillary muscles cannot be segmented as part of the endocardium, while other cardiac organs are considered to be part of the myocardium. There is significant overlap between the Gaussian component of the myocardium and the background. To adjust for these cases, anatomy-based and shape-drive constraints have to be introduced.

Anatomy and Shape-Driven Modules

Using visual information has been proven to be very efficient in image segmentation/grouping applications. However, for the left ventricle segmentation problem solving the inference based on visual information is not always feasible. The physiology of the heart and its behavior during cardiac cycles, has been exhaustively studied. Therefore, knowledge from other domains have to used to derive low level modules that improve the segmentation performance of the algorithm.

Anatomical Constraints

According to visual information, segmentation of the left ventricle in cardiac MR images has been associated with two evolving interfaces, that is, inner cardiac contours and outer cardiac contours.

In the left ventricle case, evolving interfaces are used to describe the behavior of some components of the heart. Their relative positions are connected in some way and have to respect some given anatomical constraints.

Therefore, distance and respectively, the relative positions of the evolving interfaces, can be constrained to be within a given set of acceptable values. Similar constraints that have been motivated by human anatomy have been used in the prior art for the segmentation of the cortex and the left ventricle. Evolving motion equations that preserve the distance constraint have been proposed and also introduced using an energy minimization framework.

Figure 5:
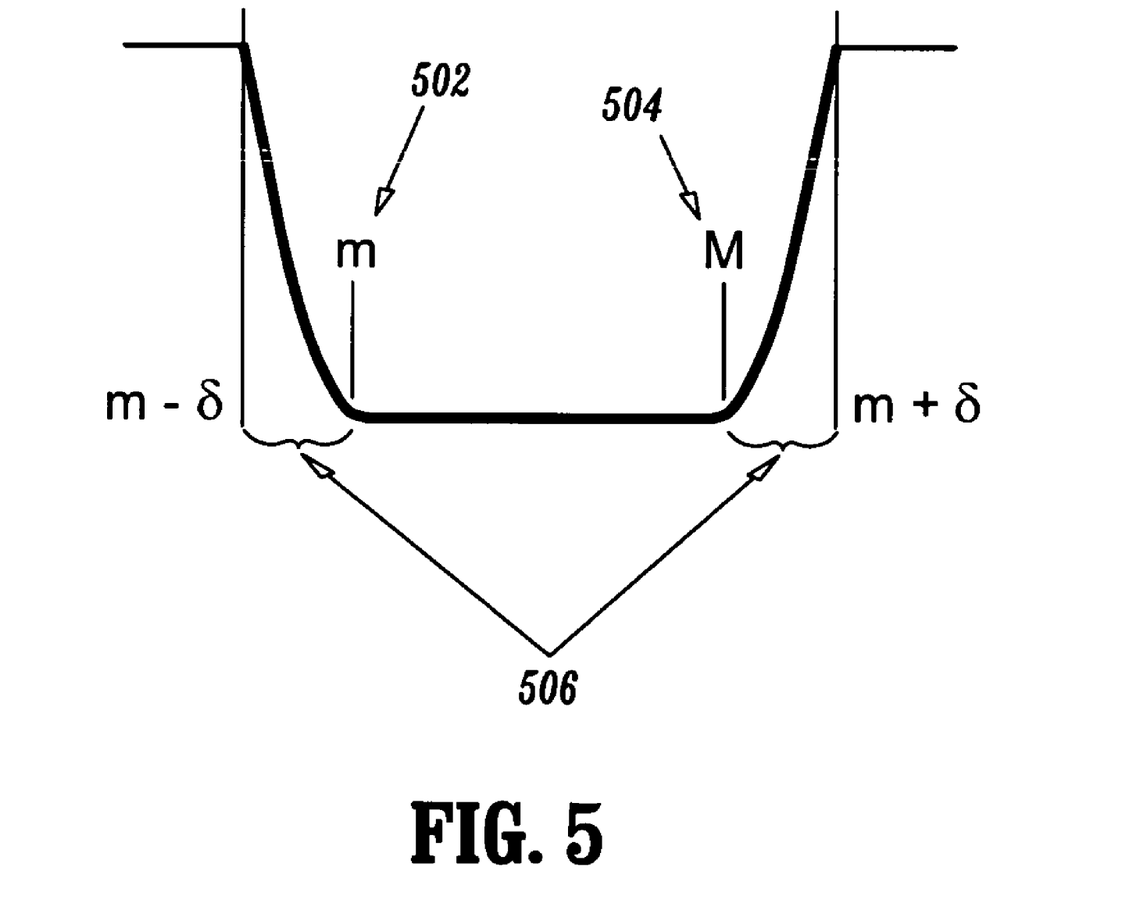
FIG. 5 illustrates a coupling function according to an embodiment of the present invention.

The use of level set representations and the distance transform as an embedding function results in a straight-forward way to estimate the distance between evolving interfaces. Referring to FIG. 5, a coupling function h is shown as:

$$h\delta(x) = \begin{cases} 1, & \text{if } [x \leq n] \cup [x > M] \\ 0, & \text{if } [m < x < M] \\ \left(\frac{x-m}{\delta}\right)^2, & \text{if } [m-\delta < x \leq m] \\ \left(\frac{x-M+\delta}{\delta}\right)^2, & \text{if } [M \leq x \leq M+\delta] \end{cases}$$

where m 502 and M 504 are the minimum and maximum allowed distance between the inner and the outer contour, and δ 506 is a parameter that determines the extremum and the infimum of the constraint.

An anatomy-driven constraint that aims at preserving the distance between the endocardium and the epicardium can then be introduced. This constraint also accounts for some internal properties of the evolving interfaces, such as, smoothness, and is given by:

$$E_A(\Phi_I,\Phi_O) = \int\int_\Omega \delta_\alpha(\Phi_I)h(|\Phi_O|)|\nabla\Phi_I| + \int\int_\Omega \delta_\alpha(\Phi_O)h(|\Phi_I|)|\nabla\Phi_O|$$

The interpretation of this function is clear; when the distance between the evolving interfaces is within an acceptable range, this component becomes inactive. In contrast, when the constraint is not satisfied, then the component tends to propagate the evolving interfaces towards the direction that preserves the anatomical constraint. This term is similar to the original boundary attraction component, that is, a geodesic active contour. However, it has an adaptive behavior since the desired image properties, such as, level set representations/distance values, are dynamically updated.

Level Set Physiological Shape Priors

Shape-driven approaches are a common selection for medical image segmentation. The use of B-Splines, Deformable templates, and Fourier descriptors can provide fairly good solutions for noisy, incomplete and physically corrupted data, such as, medical volumes. A first step towards using shape-driven constraints refers to the definition of prior shape models, that is, parameterization of an evolving interface. This step is also known as a training phase and creates a representative shape model from a given set of examples. The present invention employs a shape-driven approach based on a shape-driven principle described in "Shape Priors for Level Set Represetantions," by Paragyios, et al., U.S. patent application Ser. No. 60/354,005, which is incorporated by reference herein in its entirety.

Medical Shape Prior Model Construction

The next step of an embodiment according to the present invention, is construction of a shape model, using aligned contours. A stochastic framework with two unknown variables can be used. The variables can be a shape image, $\Phi_M(x,y)$ and local degrees, such as, variability, of shape deformations $\sigma_M(x,y)$. Each grid location can be described in a shape model using a Gaussian density function. Furthermore, a constraint that the shape image is a level set representation can be imposed. An embodiment according to the present invention further comprises a two-step approach based on variational principles. The two-step approach is used to obtain the level set representation. During a first step, an optimal solution according to data driven terms, that minimizes the distance between the model and the input shapes, that is, maximization of the joint density while preserving a smooth variability map, such that:

$$E(\Phi_M, \sigma_M) = (1-\alpha)$$

$$\underbrace{\int\int_\Omega \left(\left(\frac{d}{dx}\sigma_M(x,y)\right)^2 + \left(\frac{d}{dy}\sigma_M(x,y)\right)^2\right) dx dy}_{\text{smoothness}} +$$

$$\underbrace{\frac{\alpha}{n}\int\int_\Omega \sum_{i=1}^{n}\left(\log[\sigma_M(x,y)] + \frac{\Phi_i(x,y) - \Phi_M(x,y))^2}{2\sigma_M^2(x,y)}\right) dx dy}_{\text{data attraction}}$$

is determined. In a second step, an optimal projection of the solution of the first step, at the manifold of acceptable solutions, such as, distance functions, is determined:

$$\frac{d}{dt}\Phi_M = (1 - sgn(\Phi_M^0))(1 - |\nabla\Phi_M|)$$

The two steps alternate until the system reaches a steady-state solution. Upon convergence of the system, a level set representation is obtained that optimally expresses the training set, using some local degrees of variability that are spatially smooth.

Level Set Shape Prior Constraint

To evolve an interface and consequently, its level set representation [$\Phi$], while respecting some known shape properties $\Phi_M(x,y)$ is an objective of a shape prior constraint. Assume that all instances of the evolving representation belong to the family shapes that is generated by applying all possible global transformations to the prior shape model.

Thus, given $\Phi$, there is an ideal transformation $A=(A_x, A_y)$ between the shape prior and the evolving representation that maps each value to the most probable value on the model:

$$\begin{cases} (x,y) \to A(x,y) \\ \max_{x,y}\{p_A^M(x,y)\} \forall (x,y) : H_\alpha(\Phi(x,y)) \geq 0 \end{cases}$$

The most probable transformation is the one that maximizes joint density for all pixels. Presuming that these densities are independent across pixels, the minimization of the [−log] function can be considered as global optimization criterion:

$$E(\Phi, A) = \int\int_\Omega H_\alpha(\Phi)\left[\log(\sigma_M(A)) + \frac{(s\Phi - \Phi_M(A))^2}{2\sigma_M^2(A)}\right]$$

The interpretation of this functional is straightforward. A transformation and a level set representation, that maximize posterior probability pixel-wise given the shape prior model, have to be determined. This model refers to a non-stationary measurement where pixels are considered according to the confidence of their projections in the shape prior model.

For a left ventricle solution, presume the existence of two shape prior models, one for the endocardium [$\Phi_{\{I,M\}}, \sigma_{\{I,M\}}$] and one for the epicardium [$\Phi_{\{O,M\}}, \sigma_{\{O,M\}}$]. These models can be built using manual segmented data. Introduce a registration/shape prior component to a segmentation process that (i) registers the evolving representations to the prior models, and (ii) deforms the evolving representations locally towards a better matching with the prior models. Therefore, $$E_s(\Phi_I, \Phi_O, A_I, A_O) =$$

$$\underbrace{\int\int_\Omega H_\alpha(\Phi_I)\left[\log(\sigma_{\{I,M\}}(A_I)) + \frac{s_I\Phi_I - \Phi_{\{I,M\}}(A_I))^2}{2\sigma_{\{I,M\}}^2(A_I)}\right]}_{\text{endocardium shape prior}} +$$

$$\underbrace{\int\int_\Omega H_\alpha(\Phi_O)\left[\log(\sigma_{\{O,M\}}(A_O)) + \frac{(s_O\Phi_O - \Phi_{\{O,M\}}(A_O))^2}{2\sigma_{\{O,M\}}^2(A_O)}\right]}_{\text{epicardium shape prior}}$$

where $A_I$ is the registration, that is, rigid transformation between the endocardium and its prior shape model [$\Phi_{\{I,M\}}, \sigma_{\{I,M\}}$]. The same notation can be used for the epicardium.

Integration of visual information modules with anatomical constraints and prior shape knowledge can be performed using optimization criterion combining five different components using some weight factors:

$$E(\Phi_I, \Phi_O, A_I, A_O) = w_1\underbrace{E_G(\Phi_I, \Phi_O)}_{\text{regularity}} + w_2\underbrace{E_B(\Phi_I, \Phi_O)}_{\text{boundary}} +$$

$$w_3\underbrace{E_R(\Phi_I, \Phi_O)}_{\text{region}} + w_4\underbrace{E_A(\Phi_I, \Phi_O)}_{\text{anatomy}} + w_5\underbrace{E_s(\Phi_I, \Phi_O, A_I, A_O)}_{\text{Shape Prior}}$$

The defined objective function refers to two sets of unknown variables. The two sets of unknown variables are two level set functions for the epicardium and endocardium, and two rigid transformations between the evolving representations and the shape prior models. The minimization of the objective function can be done using a gradient descend method and the calculus of variations.

With regard to energy parameters, the boundary term has an insignificant contribution. Also, the anatomical constraint holds a minor role since it varies significantly over space and time. Finally, the regularity constraint is overwritten by the use of the shape prior term that privileges a certain topology. Therefore, two components are used, the region module and the shape prior term.

The numerical implementation of an embodiment according to the present invention is now described. The level set implementation is performed using a Narrow Band Method. The essence of the Narrow Band Method is to perform level set propagation within a limited zone, that is, a parameter of the DIRAC and HEAVISIDE distributions, located around the latest position of the propagating contours, in the inward and outward direction. Thus, working area is significantly reduced, resulting in a significant decrease of the computational complexity per iteration. However, the Narrow Band Method requires a frequent re-initialization of level set functions that can be performed using a Fast Marching algorithm.

An embodiment of the present invention comprises segmentation of the left ventricle in Magnetic Resonance images by using level set representations.

Another embodiment according to the present invention comprises a formulation that solves segmentation and registration problems simultaneously. This advantageously allows simultaneously recovering an optimal segmentation map and a transformation that optimally is a final result to a predefined shape model.

Another embodiment according to the present invention, comprises level set representations, knowledge from medicine and physiology, and available visual information for improving the segmentation performance to physically corrupted data. Furthermore, the mathematical framework that is described, although based on two dimensional visual information can be extended to three dimensional space due to the nature of the selected representation.

The teachings of the present disclosure are preferably implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more Central Processing Units ("CPUs"), a Random Access Memory ("RAM"), and Input/Output ("I/O") interfaces. The computer platform may also include an operating system and micro instruction code. The various processes and functions described herein may be either part of the micro instruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for segmentation of medical images comprising the steps of:
    inputting a mathematical functional into a system for tracking moving interfaces, wherein said mathematical functional accounts for global/local shape properties of a physiological object of interest that is to be recovered;
    visualizing image information wherein said information includes boundary and regional data; and
    recovering said physiological object of interest by optimizing said mathematical functional integrated with said image information.

2. The method of claim 1, further comprising the step of combining said mathematical functional with a level set objective function having a medical shape model.

3. The method of claim 2, wherein said level set objective function includes a bi-directional boundary flow.

4. The method of claim 2, wherein said medical shape model includes a medical shape model having a degree of variability.

5. The method of claim 1, further comprising the step of combining said mathematical functional with a physiology based functional for constraining the solution space and a term that accounts for shape driven consistency.

6. The method of claim 1, further comprising the step of combining said mathematical functional with an intensity regional function that maximizes a posteriori segmentation probability.

7. The method of claim 1, further comprising the step of optimizing a resulting objective function using a gradient descent method.

8. A method for segmentation of medical images comprising the steps of:
    developing a medical shape model on level set space for tracking moving interfaces;
    using said medical shape model for introducing a physiological shape prior in an energetic form; and
    recovering a physiological object of interest by minimizing non-stationary distance between an evolving interface and said medical shape model.

9. The method of claim 8, wherein said medical shape model is developed using a variational framework to create a non-stationary pixel-wise model that accounts for shape variabilities.

10. The method of claim 8, further comprising the step of minimizing non-stationary distance between an evolving interface and said medical shape model.

11. The method of claim 8, further comprising the step of integrating said medical shape model and said physiological shape prior in energetic form into a data-driven variational method that performs image segmentation.

12. The method of claim 8, further comprising the step of integrating an intensity-based regional module that maximizes a posteriori segmentation probability.

13. The method of claim 8, further comprising the step of integrating a physiology-based module that constrains solution space and a term that accounts for shape driven consistency.

14. The method of claim 8, further comprising the step of optimizing a resulting objective function using a gradient descent method.

15. A program storage device readable by machine, tangibly embodying a program of instructions executable by the machine to perform method steps for segmentation of medical images, the method steps comprising:

developing a medical shape model on level set space for tracking moving interfaces;

using said medical shape model for introducing a physiological shape prior in an energetic form; and recovering a physiological object of interest by minimizing non-stationary distance between an evolving interface and said medical shape model.

16. The program storage device of claim 15, wherein said medical shape model is developed using a variational framework to create a non-stationary pixel-wise model that accounts for shape variabilities.

17. The program storage device of claim 15, wherein the method steps further comprise the step of minimizing non-stationary distance between an evolving interface and said medical shape model.

18. The program storage device of claim 15, wherein the method steps further comprise the step of integrating said medical shape model and said physiological shape prior in energetic form into a data-driven variational method that performs image segmentation.

19. The program storage device of claim 15, wherein the method steps further comprise the step of integrating an intensity-based regional module that maximizes a posteriori segmentation probability.

20. The program storage device of claim 15, wherein the method steps further comprise the step of integrating a physiology-based module that constrains solution space and a term that accounts for shape driven consistency.

21. The program storage device of claim 15, wherein the method steps further comprise the step of optimizing a resulting objective function using a gradient descent method.

* * * * *